United States Patent
Dutta

(10) Patent No.: US 10,217,080 B1
(45) Date of Patent: Feb. 26, 2019

(54) ITEM CLASSIFICATION USING VISIBLE ATTRIBUTES

(71) Applicant: Amazon Technologies, Inc., Seattle, WA (US)

(72) Inventor: Archiman Dutta, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 14/670,259

(22) Filed: Mar. 26, 2015

(51) Int. Cl.
*G06Q 10/08* (2012.01)
*G06F 17/30* (2006.01)
*G06F 7/00* (2006.01)

(52) U.S. Cl.
CPC ..... *G06Q 10/087* (2013.01); *G06F 17/30598* (2013.01)

(58) Field of Classification Search
USPC .......................................................... 705/28
See application file for complete search history.

(56) References Cited

U.S. PATENT DOCUMENTS

| | | | |
|---|---|---|---|
| 6,701,333 B2 | 3/2004 | Suermondt et al. | |
| 7,809,672 B1 | 10/2010 | Tenorio | |
| 7,809,723 B2 | 10/2010 | Liu et al. | |
| 8,266,003 B1 | 9/2012 | Mirchandani et al. | |
| 8,321,455 B2 | 11/2012 | Warner et al. | |
| 8,423,489 B2 | 4/2013 | Johnson et al. | |
| 8,630,915 B1 | 1/2014 | Mirchandani et al. | |
| 2007/0271146 A1* | 11/2007 | Nordmark | G06Q 30/02 705/26.8 |
| 2008/0154873 A1 | 6/2008 | Redlich et al. | |
| 2009/0204547 A1 | 8/2009 | Rowan | |
| 2013/0013603 A1 | 1/2013 | Parker et al. | |
| 2014/0379616 A1 | 12/2014 | Sun et al. | |

OTHER PUBLICATIONS

U.S. Appl. No. 14/640,974, filed Mar. 6, 2015, Archiman, Dutta, et al.

* cited by examiner

*Primary Examiner* — Garcia Ade
(74) *Attorney, Agent, or Firm* — Robert C. Kowert; Meyertons, Hood, Kivlin, Kowert & Goetzel, P.C.

(57) ABSTRACT

Methods, systems, and computer-readable media for item classification using customer-visible attributes are disclosed. A plurality of terms are determined that describe a plurality of items in a marketplace. Individual ones of the items are classified in a hierarchical taxonomy comprising a plurality of classifications, and individual ones of the terms correspond to individual ones of the classifications. A description of a new item is received. The description of the new item comprises a plurality of customer-visible terms. One or more of the plurality of classifications in the hierarchical taxonomy are selected for the new item. The one or more classifications are selected for the new item based at least in part on automated matching of individual ones of the customer-visible terms to individual ones of the terms that correspond to individual ones of the classifications.

20 Claims, 11 Drawing Sheets

ITEM CLASSIFICATION USING VISIBLE ATTRIBUTES

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

For example, web servers backed by distributed systems may provide online marketplaces that offer goods and/or services for sale to consumers. Consumers may visit a marketplace website to view and/or purchase goods and services offered for sale by the merchant operating the website (and/or third-party merchants). Some online marketplaces include large online catalogs of items offered for sale. For an item offered for sale, an online marketplace typically include a product detail page (e.g., a web page) that specifies various information about the item, such as a description of the item, one or more pictures of the item, as well as specifications (e.g., weight, dimensions, capabilities) of the item. Additionally, an online marketplace may offer other types of pages to potential customers, such as a home page that introduces a customer to the marketplace and a search page that lists products relevant to one or more search terms.

The catalog of items may be organized using a hierarchical classification system, otherwise referred to as a "hierarchical taxonomy" or simply "taxonomy." Generally speaking, a hierarchical classification system is a classification system in which items are arranged based on some hierarchical structure. If the hierarchical structure is a tree, each node of the tree may represent a different classification. An individual item may be classified by placing the item in one of the various leaves of the tree, in one of the branches, or even in the root. From the root through the branches to the leaves, the nodes may represent increasing degrees of specificity in the classification scheme. A well-known example of a hierarchical classification system is the taxonomic system used in modern biology, where the major taxonomic ranks include: kingdom, phylum, class, order, family, genus, and species. Another example of a hierarchical classification system is a product classification scheme used by an online merchant. For a system maintained by an online merchant, the classification of products into a hierarchy of classifications may permit customers to find desired categories of products by navigating up or down the hierarchy.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for item classification using customer-visible attributes are described. Using the techniques described herein, items may be automatically classified in a marketplace using customer-visible attributes (e.g., descriptive terms) provided by merchants. Items in the marketplace may be classified in various classifications in a hierarchical taxonomy. In selecting one or more classifications for an item, a requested classification and/or other customer-invisible attributes provided by a merchant may be disregarded. The classification(s) may be selected for an item by comparing the customer-visible terms for the item with a set of descriptive terms for existing items in the marketplace. If a match is found, the item may be assigned to one or more of the classifications that correspond to the matching descriptive terms. In this manner, items may be automatically assigned to proper classifications in a marketplace while mitigating the potential "gaming" of classifications by merchants.

Figure 1:
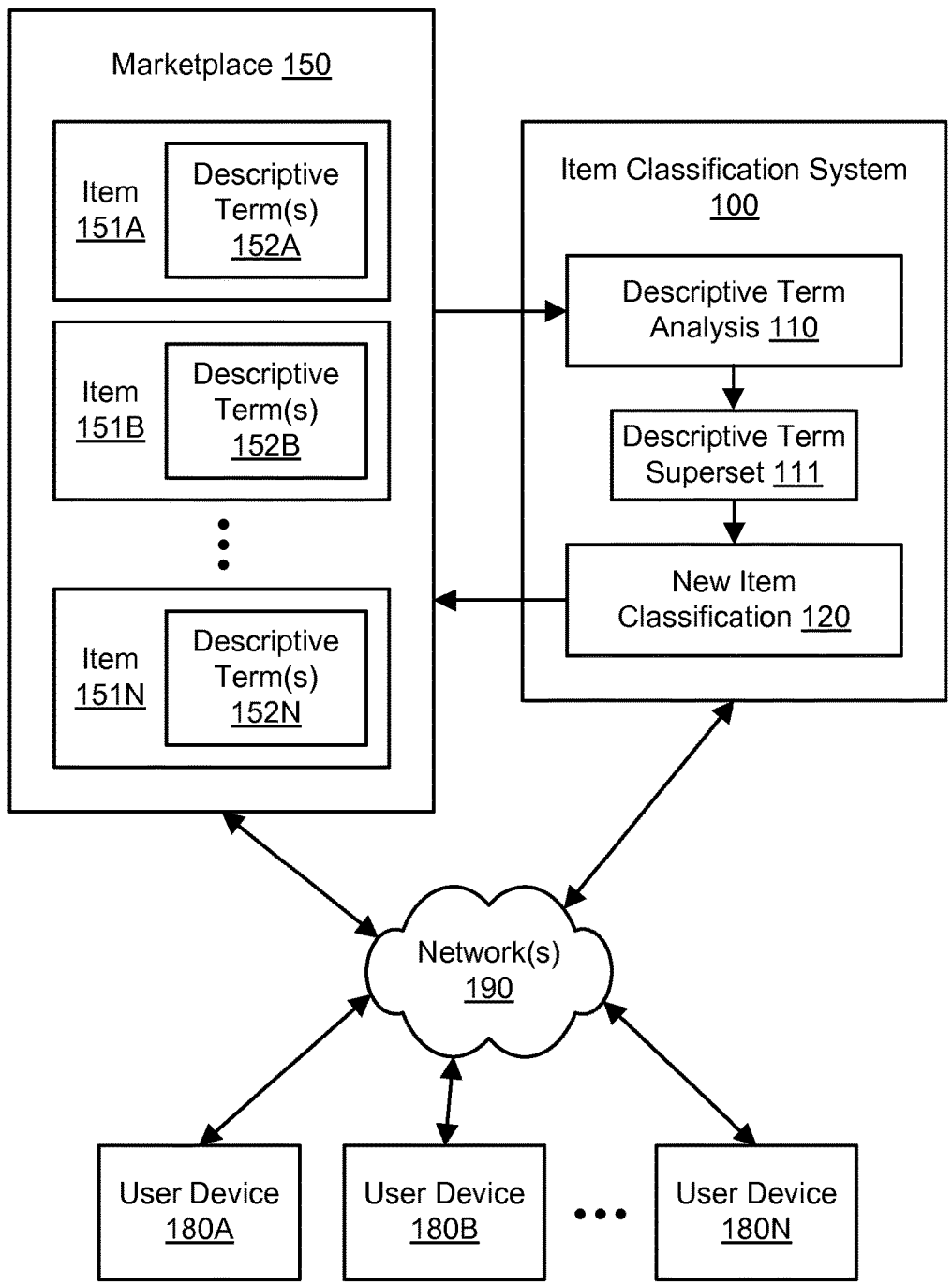
FIG. 1 illustrates an example system environment for item classification using customer-visible attributes, according to one embodiment.

FIG. 1 illustrates an example system environment for item classification using customer-visible attributes, according to one embodiment. The example system environment may comprise an automated item classification system 100 that classifies items for a marketplace 150. As shown for purposes of illustration and example in FIG. 1, three items 151A, 151B, and 151N are included in the marketplace 150. However, it is contemplated that the marketplace 150 may include any suitable number and type of items. The items 151A-151N may comprise goods, services, and/or other products that may be offered to customers by one or more merchants. The items 151A-151N may be placed into different classifications that represent different categories of products or services. Entities such as merchants may submit data associated with new items that the merchants seek to offer in the marketplace 150. As will be discussed in greater detail below, the new items may be automatically placed into proper classifications in the marketplace 150.

The automated item classification system 100 may include various components, modules, or other functionalities such as a descriptive term analysis functionality 110 and a new item classification functionality 120. As will be discussed in greater detail below, the descriptive term analysis functionality 110 may generate a descriptive term superset 111 based on automated analysis of descriptive terms associated with one or more of the items 151A-151N. As will be discussed in greater detail below, the new item classification functionality 120 may classify new items (e.g., as submitted by merchants) into existing classifications in the marketplace 150 based on descriptive terms associated with the new items. Customer-invisible attributes, such as a requested classification supplied by a merchant for a new item, may be disregarded in classifying the new item. By properly classifying items so that customers of the marketplace 150 may find desired categories of items quickly and efficiently, the automated item classification system 100 may improve sales for one or more merchants using the marketplace 150 to interact with customers.

In one embodiment, each of the items 151A-151N may be associated with a set of descriptive terms in the marketplace 150. As shown in the example of FIG. 1, the item 151A may be associated with one or more descriptive terms 152A, the item 151B may be associated with one or more descriptive terms 152B, and the item 151N may be associated with one or more descriptive terms 152N. The descriptive terms 152A-152N may be stored using any suitable techniques for organizing and storing data and/or metadata. The descriptive terms 152A-152N may include the titles for one or more of the corresponding items 151A-151N, the descriptions for one or more of the corresponding items 151A-151N, and/or any other suitable data or metadata. The descriptive terms 152A-152N may include any suitable words or phrases (e.g., expressed in a natural language) to describe or characterize aspects of the corresponding items 151A-151N. For example, if the items 151A-151N include items of clothing, then the descriptive terms may include terms characterizing the type of clothing as well as terms characterizing particular varieties (e.g., by color) or indicating particular brands. The descriptive terms 152A-152N may be supplied by the entity that operates the marketplace 150, by merchants that add individual items to the marketplace, by one or more manufacturers of the items 151A-151N, by one or more distributors of the items 151A-151N, and/or by one or more customers of the marketplace 150.

The descriptive term analysis functionality 110 may generate a descriptive term superset 111 based on automated analysis of descriptive terms 152A-152N associated with one or more of the items 151A-151N. The terms in the descriptive term superset 111 may also be referred to as tags. At least a portion of the descriptive terms 152A-152N may be represented in the descriptive term superset 111. In one embodiment, deduplication techniques may be used in generating the descriptive term superset 111 based the descriptive terms 152A-152N. In one embodiment, statistical analysis of the descriptive terms 152A-152N may be used to generate the descriptive term superset 111. In one embodiment, only a portion of the descriptive terms 152A-152N may be used for the analysis; for example, only the first few words of an item's full description may be used. In one embodiment, the statistical analysis may include determining the frequency count of various terms and selecting one or more terms to represent a particular classification based on the relative frequency counts. In one embodiment, the descriptive terms may be determined for a set of "golden" items whose classifications have been verified. The classifications may be verified by automatic techniques or by manual techniques, e.g., involving input from one or more managers of various item categories in the marketplace. The descriptive term analysis functionality 110 may be used a plurality of times, e.g., periodically or continuously, to keep the descriptive term superset 111 updated.

The new item classification functionality 120 may classify new items (e.g., as submitted by merchants) into existing classifications in the marketplace 150 based on descriptive terms associated with the new items. In one embodiment, a merchant who seeks to list a new item on the marketplace 150 may submit descriptive terms for the new item. The descriptive terms may be part of a title and/or description for the new item and may be intended to be customer-visible. Using the new item classification functionality 120, a new item may be assigned to one or more classifications in the marketplace 150 by matching the descriptive terms associated with the new item to the descriptive terms (from the descriptive term superset 111) associated with various ones of the classifications.

As used herein, the term "customer-visible" (also referred to as "customer-facing") may indicate that attributes (e.g., descriptive terms) are intended to be displayed to customers in a marketplace, e.g., by presenting the attributes to customers in one or more web pages that may permit customers to engage in various transactions (e.g., sale or rental) regarding one or more items that are described or characterized by the attributes. As used herein, a "descriptive term" may include one or more words or phrases. As used herein, the term "customer" may include a potential customer, e.g., an individual or entity that may browse items in a marketplace, search for items in a marketplace, and/or potentially take part in various transactions (e.g., sale or rental) regarding one or more items in a marketplace. As used herein, the term "merchant" may include an individual or entity that may seek to take part in the various transactions (e.g., sale or rental) with customers of a marketplace, e.g., by offering one or more items to customers.

Figure 8:
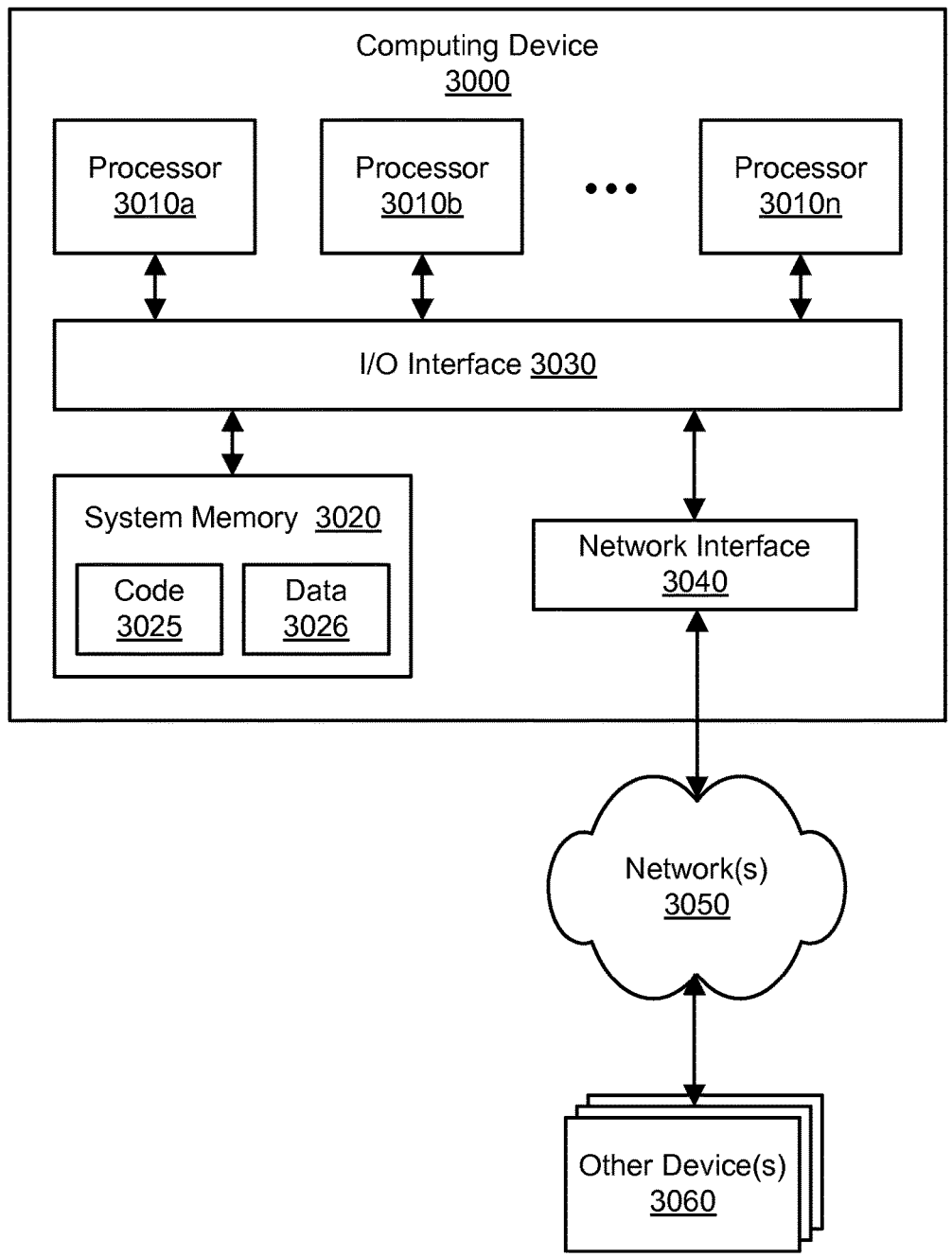
FIG. 8 illustrates an example computing device that may be used in some embodiments.

The automated item classification system 100 and marketplace 150 may be implemented using any suitable number and configuration of computing devices, any of which may be implemented by the example computing device 3000 illustrated in FIG. 8. The computing devices may be located in any suitable number of data centers or geographical locations. In various embodiments, the functionality of the different components of the automated item classification system 100 and marketplace 150 may be provided by the same computing device or by different computing devices. If any of the components of the automated item classification system 100 and marketplace 150 are implemented using different computing devices, then the components and their respective computing devices may be communicatively coupled, e.g., via network(s) 190. Each of the components of the automated item classification system 100 and marketplace 150 may represent any combination of software and hardware usable to perform their respective functions, as discussed as follows. Operations implemented by the automated item classification system 100 and/or marketplace 150 may be performed automatically, e.g., without a need for user initiation or user intervention after an initial configuration stage, and programmatically, e.g., by execution of program instructions on a computing device. It is contemplated that the automated item classification system 100 and/or marketplace 150 may include additional components not shown, fewer components than shown, or different combinations, configurations, or quantities of the components shown.

Using the techniques described herein, items in the marketplace 150 may be automatically classified into suitable classifications in a taxonomy, e.g., based on the descriptive terms associated with the items. The taxonomy may then be made available to customers of the marketplace 150 so that the customers may quickly and efficiently navigate the taxonomy to find items of interest. The automated item classification system 100 and/or marketplace 150 may be operated by or on behalf of an internet-based merchant or other online entity. The items 151A-151N may be listed on the marketplace 150 by the merchant who operates the marketplace and/or by additional "third party" merchants. In one embodiment, the marketplace 150 may generate various types of web pages that permit customers to search for items in a product catalog, browse categories of products, view detailed information for particular items, purchase particular items, or engage in other types of transactions with a merchant. For example, the marketplace may generate, for a particular user of the marketplace, an interactive page that includes data indicative of a particular item or a set of items in one of the classifications of the taxonomy. As used herein, the term "page" or "web page" may include HTML-formatted pages as well as any other interactive formats that may be displayed to a customer in a browser or dedicated marketplace application, such that the customer may enter input into a page to modify the display in the browser program or dedicated application, e.g., to drill down from a list of marketplace items to a particular item, engage in a transaction with a merchant related to an item, or navigate to another portion of the taxonomy.

Merchants and/or customers may interact with the marketplace 150 using a plurality of user devices such as user devices 180A, 180B, and 180N. Although three user devices 180A, 180B, and 180N are shown for purposes of illustration and example, it is contemplated that any suitable number and configuration of user devices may interact with the marketplace 150. The user devices 180A-180N may be coupled to the marketplace 150 using one or more networks 190, such as the internet. The user devices 180A-180N may be implemented using any suitable number and configuration of computing devices, any of which may be implemented by the example computing device 3000 illustrated in FIG. 8.

Figure 2:
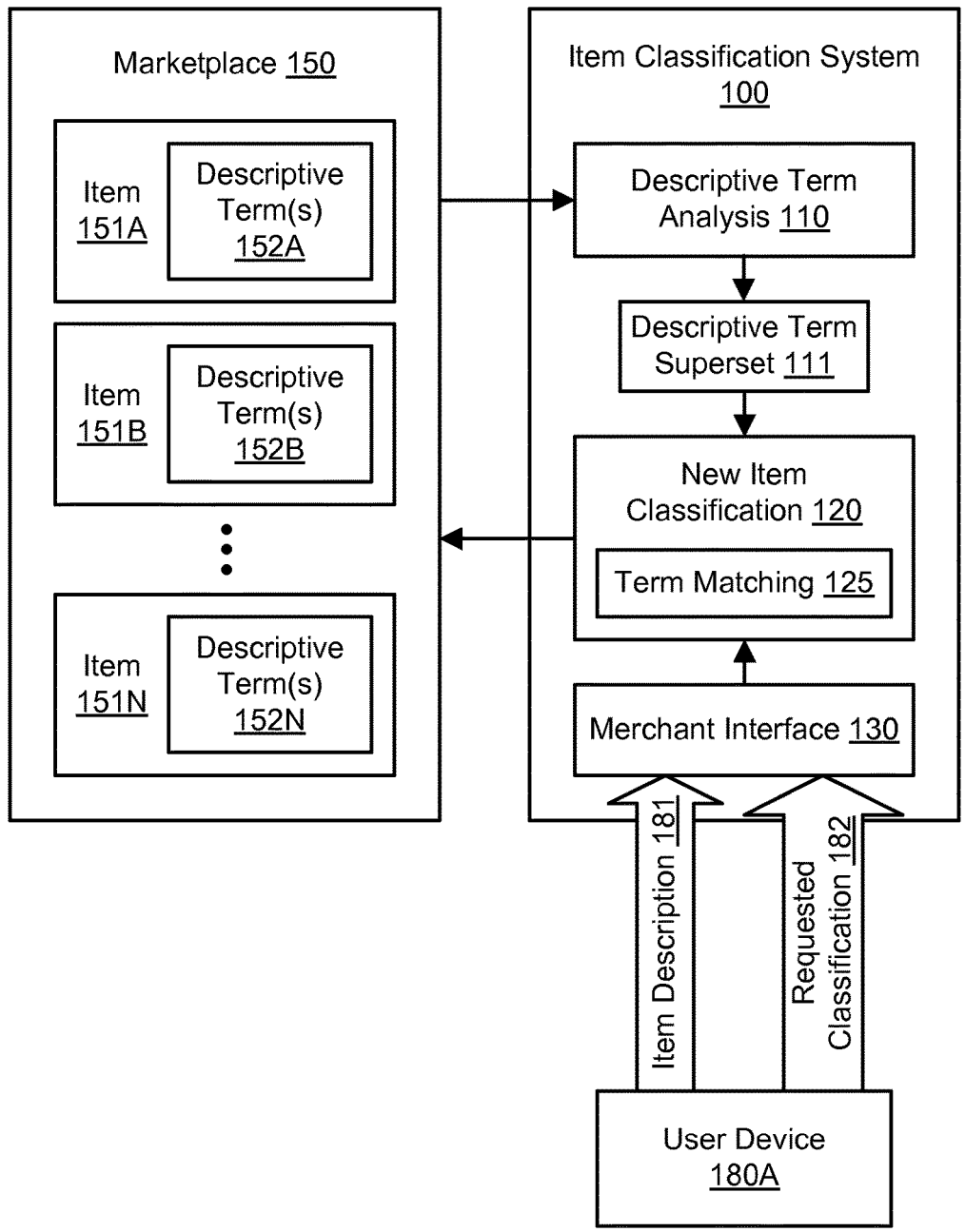
FIG. 2 illustrates further aspects of the example system environment for item classification using customer-visible attributes, including a merchant supplying an item description and a requested classification, according to one embodiment.

FIG. 2 illustrates further aspects of the example system environment for item classification using customer-visible attributes, including a merchant supplying an item description and a requested classification, according to one embodiment. The automated item classification system 100 may include a merchant interface 130. The merchant interface 130 may permit one or more merchants to interact with the item classification system, e.g., by submitting data associated with new items that the merchants seek to offer in the marketplace 150. The merchant interface 130 may include one or more suitable application programming interfaces (APIs), graphical user interfaces (GUIs), and/or any other suitable interfaces that permit communication between the item classification system 100 and one or more merchants.

A merchant may use a device such as user device 180A to submit an item to be listed on the marketplace 150. The item may represent a product or service. To submit an item, the merchant may use the merchant interface 130 to supply details concerning the item. For example, the merchant may submit an item description 181. The item description 181 may include textual information such as a title and a description for the new item. The title may include one or more descriptive terms, and the description may include one or more descriptive terms. The merchant may also submit a requested classification 182. The requested classification 182 may be selected from a set of existing classifications in the marketplace 150.

The new item classification functionality 120 may classify the new item into one or more existing classifications in the marketplace 150 based on the descriptive terms provided with the item description 181 for the new item. A term matching functionality 125 may attempt to match the descriptive terms in the item description 181 with descriptive terms in the descriptive term superset 111. If one or more matches are found, the new item classification functionality 120 may assign the new item to one or more classifications that correspond to the descriptive terms that the new item matches. In one embodiment, the new item classification functionality 120 may disregard the requested classification 182 and any other customer-invisible attributes in determining the classification(s) for the new item.

Figure 3A:
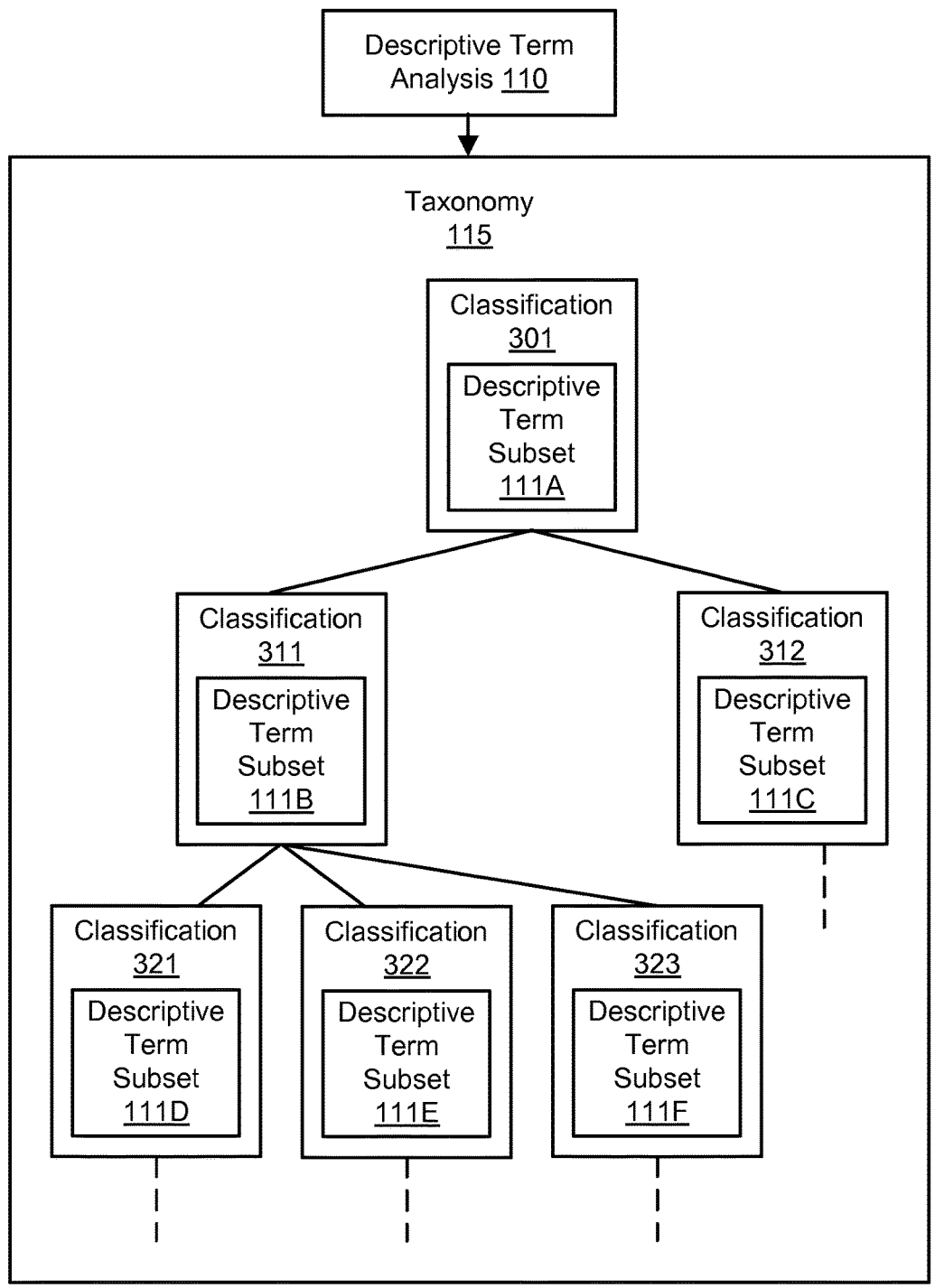
FIG. 3A illustrates an example of a taxonomy with subsets of descriptive terms that correspond to classifications, according to one embodiment.

FIG. 3A illustrates an example of a taxonomy with subsets of descriptive terms that correspond to classifications, according to one embodiment. The automated item classification system 100 may classify items into a taxonomy 115 usable for the marketplace 150. The taxonomy 115 may include a hierarchical classification scheme, such as a tree-like data structure with a plurality of linked nodes, in which individual items can be classified at particular nodes. The taxonomy 115 may comprise a plurality of nodes that are connected by edges or links. Each node may represent a particular classification, and each edge or link may represent a parent-child relationship. From the root node to branch nodes to leaf nodes, the taxonomy 115 may be organized from more generic classifications to more specific classifications. Although a particular number and configuration of classifications is shown for purposes of illustration in FIG. 3A, it is contemplated any suitable number and configuration of classifications may be used with the systems, methods, and computer-readable media described herein.

The classifications may represent categories of items offered for sale in the marketplace 150. In order of more general to more specific item categories, the taxonomy 115 may include a classification 301 at a root node at a first level; classifications 311 and 312 at branch nodes at a second level; and classifications 321, 322, and 323 at branch nodes at a third level. As indicated by the dotted lines, the taxonomy 115 may include additional levels of nodes (and their corresponding classifications), including additional branch nodes and/or leaf nodes, beneath the branch nodes corresponding to classifications 312, 321, 322, and 323. In one embodiment, the classification 301 may represent the broadest category of items offered in the marketplace 150. In one embodiment, the classification 301 may instead be a narrower category and may represent a root node of a subtree of a larger taxonomy; the node corresponding to the classification 301 may have a parent node that represents a broader category. Accordingly, the taxonomy 115 may represent an entire taxonomy of items in a marketplace 150 or merely a portion of the taxonomy, e.g., one or more subtrees of a larger taxonomy.

As discussed above, the descriptive term analysis functionality 110 may generate a descriptive term superset 111 based on automated analysis of descriptive terms 152A-152N associated with one or more of the items 151A-151N. At least a portion of the descriptive terms 152A-152N may be represented in the descriptive term superset 111. The descriptive term superset 111 may include a plurality of different subsets, and the subsets of the descriptive terms may correspond to various classifications in the marketplace 150. In one embodiment, each descriptive term subset may correspond to a particular classification. As shown in the example of FIG. 3A, a descriptive term subset 111A may correspond to classification 301, a descriptive term subset 111B may correspond to classification 311, a descriptive term subset 111C may correspond to classification 312, a descriptive term subset 111D may correspond to classification 321, a descriptive term subset 111E may correspond to classification 322, and a descriptive term subset 111F may correspond to classification 323. Each of the subsets 111A-111F may include one or more terms. The subsets 111A-111F may be overlapping or nonoverlapping.

In one embodiment, statistical analysis of the descriptive terms 152A-152N may be used to generate the descriptive term subsets 111A-111F. In one embodiment, only a portion of the descriptive terms 152A-152N may be used for the analysis; for example, only the first few words of an item's full description may be used. In one embodiment, the statistical analysis may include determining the frequency count of various terms and selecting one or more terms to represent a particular classification based on the relative frequency counts. For example, the set of items classified in the taxonomy 115 may generally include a variety of clothing items, particularly jeans. In the descriptive term superset 111, the most frequently appearing terms may include "jeans," "blue," "women's," "men's," and various terms indicating specific varieties (e.g., types of cut or fit) and brands of jeans. For the broadest classification 301, the descriptive term subset 111A may include the term "jeans." For the narrower classification 311, the descriptive term subset 111B may include the terms "jeans" and "women's." For the narrower classification 312, the descriptive term subset 111C may include the terms "jeans" and "men's." For the even narrower classifications 321-323, the descriptive term subsets 111D-111F may include terms that describe, indicate, or characterize particular varieties of women's jeans.

Figure 3B:
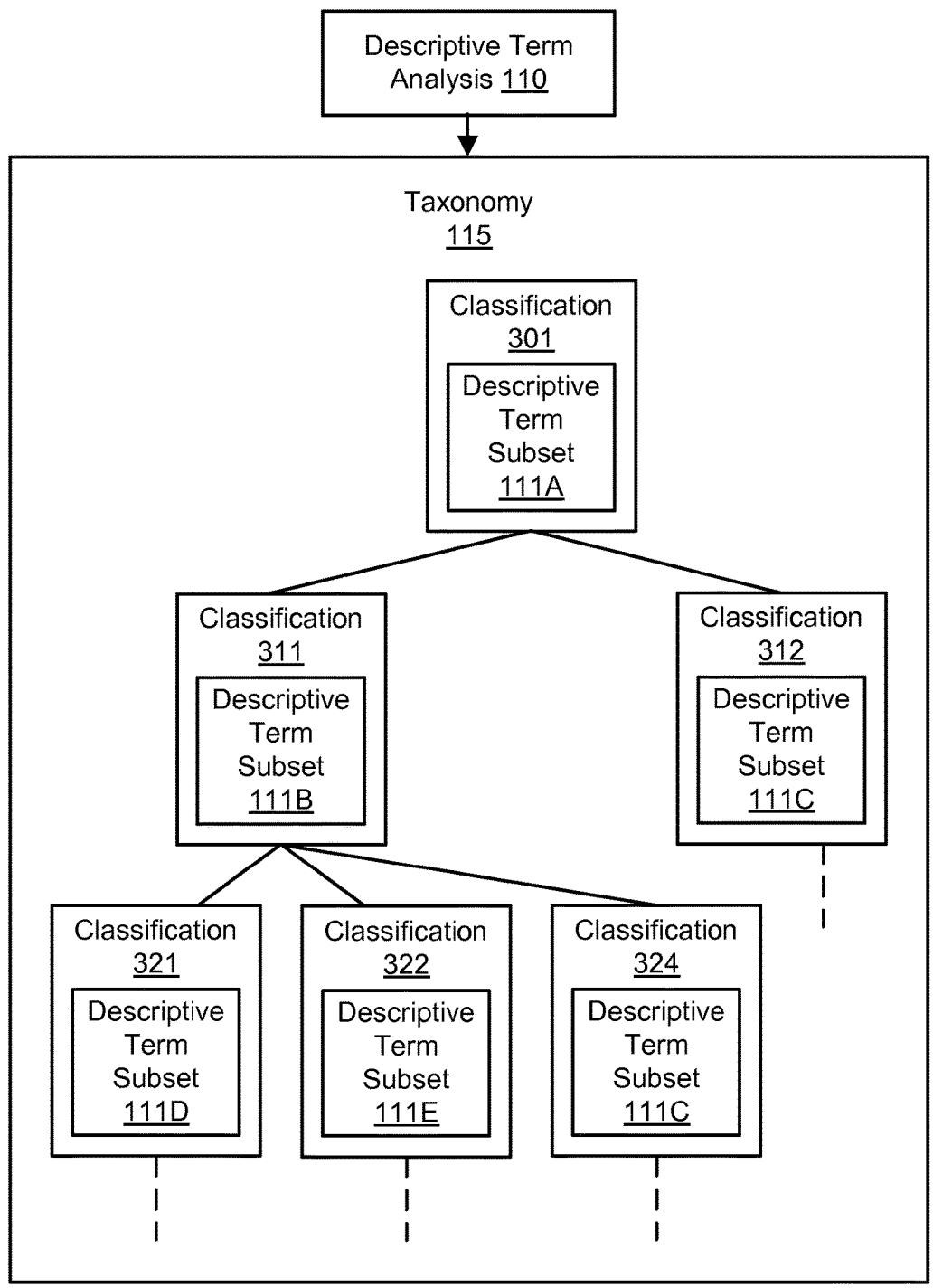
FIG. 3B illustrates an example of a taxonomy with subsets of descriptive terms that correspond to classifications, including overlapping subsets of descriptive terms, according to one embodiment.

FIG. 3B illustrates an example of a taxonomy with subsets of descriptive terms that correspond to classifications, including overlapping subsets of descriptive terms, according to one embodiment. As discussed above, the subsets of descriptive terms may be overlapping or nonoverlapping. Additionally, the correspondence between descriptive term subsets and classifications may be one-to-one or one-to-many. As shown in the example of FIG. 3B, the descriptive terms associated with classification 312 may entirely overlap with the descriptive terms associated with classification 324. Accordingly, the same descriptive term subset 111C may correspond to both classification 312 and classification 324.

Figure 4A:
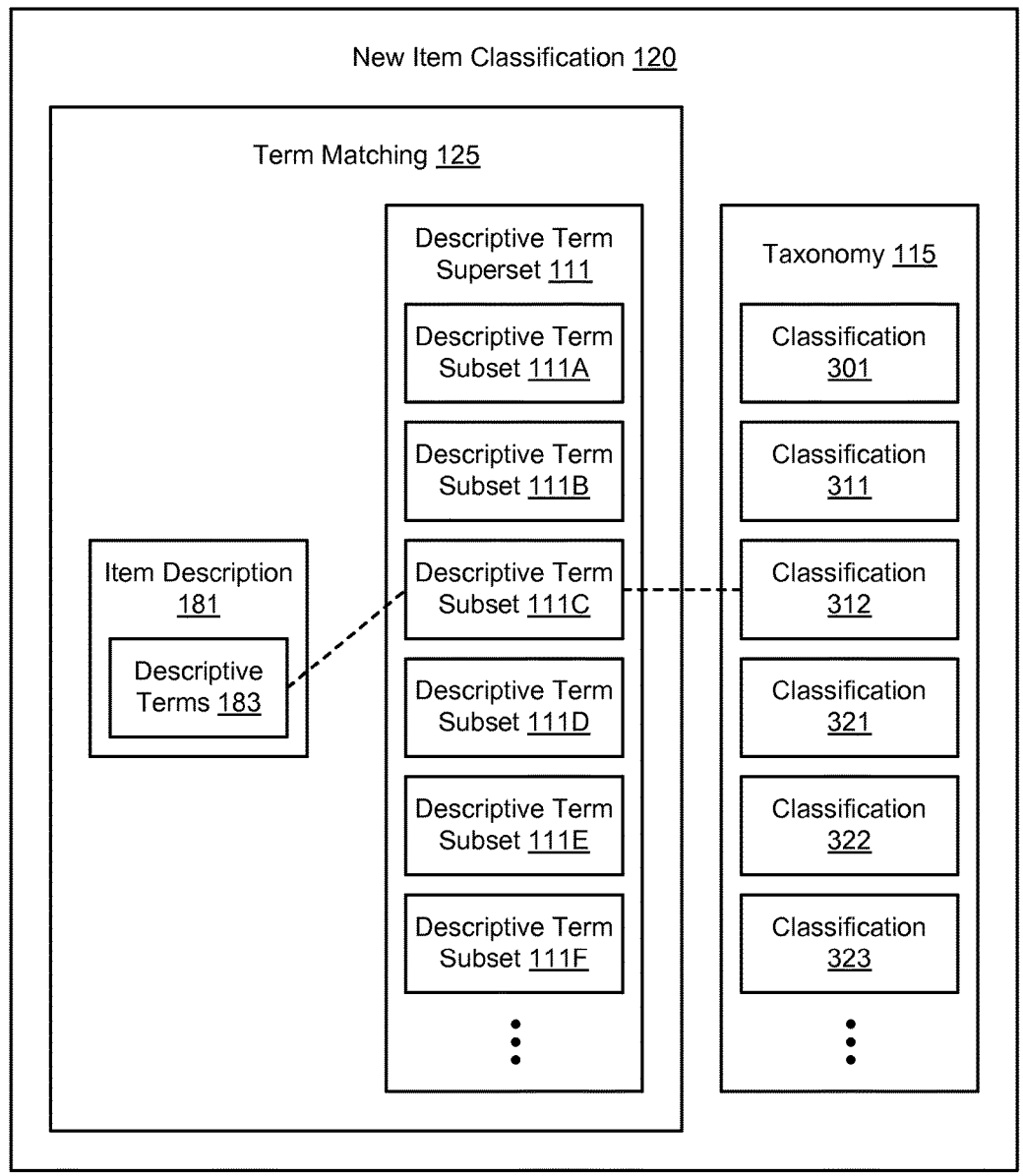
FIG. 4A illustrates an example of item classification using customer-visible attributes, including matching the descriptive terms for an item to the descriptive terms corresponding to a classification in a taxonomy, according to one embodiment.

FIG. 4A illustrates an example of item classification using customer-visible attributes, including matching the descriptive terms for an item to the descriptive terms corresponding to a classification in a taxonomy, according to one embodiment. As discussed above, the new item classification functionality 120 may classify the new item into one or more existing classifications in the marketplace 150 based (at least in part) on the descriptive terms 183 provided with the item description 181 for the new item. The term matching functionality 125 may attempt to match the descriptive terms 183 in the item description 181 with any of the subsets of descriptive terms 111A-111F. As shown in the example of FIG. 4A, the descriptive terms 183 for the new item may match those of the subset 111C.

If one or more matches are found with the descriptive terms, the new item classification functionality 120 may select one or more classifications that correspond to the descriptive terms that the new item matches. As shown in the example of FIG. 4A, the classification 312 may be selected for the new item due to the match with the corresponding descriptive term subset 111C. In one embodiment, the new item classification functionality 120 may disregard the requested classification 182 in selecting the classification(s) for the new item.

In one embodiment, the term matching functionality 125 may determine that two or more of the descriptive terms 183 are mutually exclusive with respect to the classifications 301-323. In other words, one of the descriptive terms 183 may match a first classification, and another of the descriptive terms 183 may match a second classification which has no overlap of items with the first classification. In such an event, the merchant may be asked to provide a corrected description of the new item. Additionally, the classification of the new item may fail or be postponed until the merchant provides corrected data.

Figure 4B:
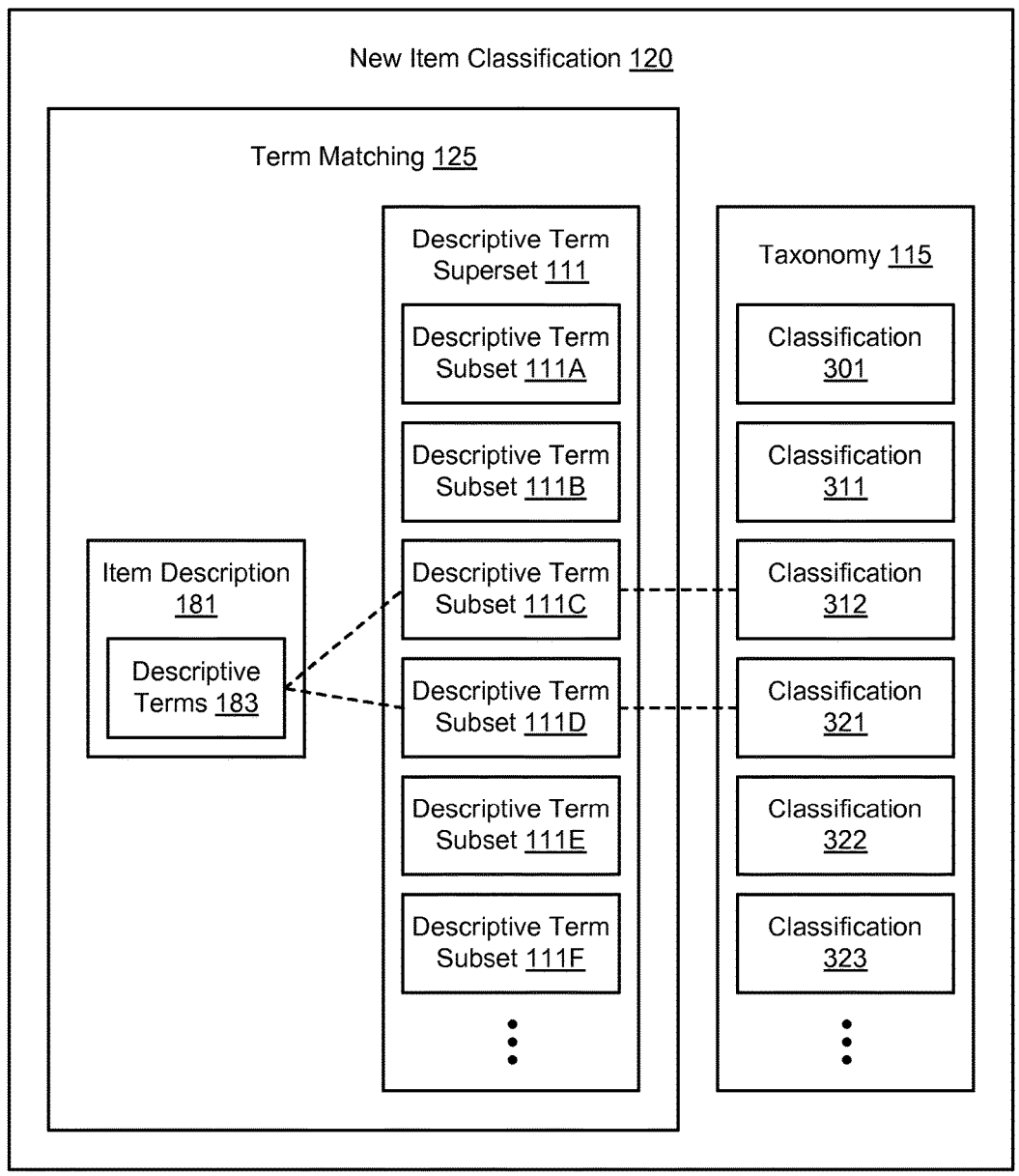
FIG. 4B illustrates an example of item classification using customer-visible attributes, including matching the descriptive terms for an item to the descriptive terms corresponding to a plurality of classifications in a taxonomy, according to one embodiment.

FIG. 4B illustrates an example of item classification using customer-visible attributes, including matching the descriptive terms for an item to the descriptive terms corresponding to a plurality of classifications in a taxonomy, according to one embodiment. As discussed above, the new item classification functionality 120 may classify the new item into one or more existing classifications in the marketplace 150 based (at least in part) on the descriptive terms 183 provided with the item description 181 for the new item. The term matching functionality 125 may attempt to match the descriptive terms 183 in the item description 181 with any of the subsets of descriptive terms 111A-111F. As shown in the example of FIG. 4B, the descriptive terms 183 for the new item may match those of the subset 111C and the subset 111D.

If one or more matches are found with the descriptive terms, the new item classification functionality 120 may select one or more classifications that correspond to the descriptive terms that the new item matches. As shown in the example of FIG. 4B, the classification 312 may be selected for the new item due to the match with the corresponding descriptive term subset 111C. Additionally, the classification 321 may be selected for the new item due to the match with the corresponding descriptive term subset 111D. In one embodiment, the new item classification functionality 120 may disregard the requested classification 182 in selecting the classification(s) for the new item.

In one embodiment, the classifications 312 and 321 may be selected as candidate classifications. Additional automated analysis may be performed to assign the new item to only one of the candidate classifications. In one embodiment, input may be solicited from the merchant who submitted the new item in order to assign the new item to only one of the candidate classifications. For example, both of the classifications 312 and 321 may be provided to the merchant (e.g., using the merchant interface 130), and input from the merchant may be received to select one of the classifications 312 or 321 for listing the new item in the marketplace 150.

Figure 4C:
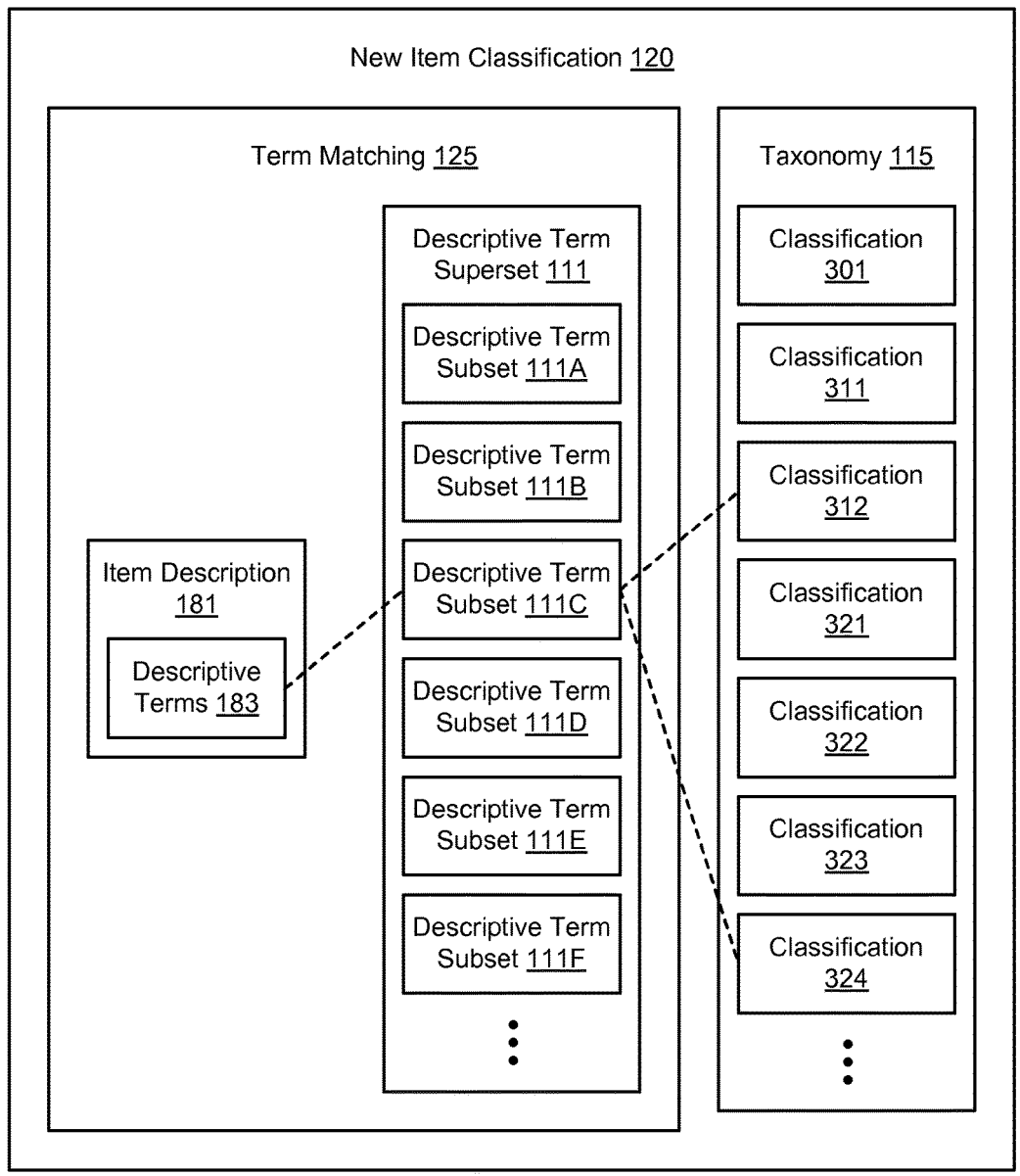
FIG. 4C illustrates an example of item classification using customer-visible attributes, including matching the descriptive terms for an item to one subset of descriptive terms corresponding to a plurality of classifications in a taxonomy, according to one embodiment.

FIG. 4C illustrates an example of item classification using customer-visible attributes, including matching the descriptive terms for an item to one subset of descriptive terms corresponding to a plurality of classifications in a taxonomy, according to one embodiment. As discussed above, the new item classification functionality 120 may classify the new item into one or more existing classifications in the marketplace 150 based (at least in part) on the descriptive terms 183 provided with the item description 181 for the new item. The term matching functionality 125 may attempt to match the descriptive terms 183 in the item description 181 with any of the subsets of descriptive terms 111A-111F. As shown in the example of FIG. 4C, the descriptive terms 183 for the new item may match those of the subset 111C.

If one or more matches are found with the descriptive terms, the new item classification functionality 120 may select one or more classifications that correspond to the descriptive terms that the new item matches. As shown in the example of FIG. 4C, the classification 312 may be selected for the new item due to the match with the corresponding descriptive term subset 111C. Additionally, the classification 324 may also be selected for the new item due to the match with the corresponding descriptive term subset 111C. In one embodiment, the new item classification functionality 120 may disregard the requested classification 182 in selecting the classification(s) for the new item.

In one embodiment, the classifications 312 and 324 may be selected as candidate classifications. Additional automated analysis may be performed to assign the new item to only one of the candidate classifications. In one embodiment, input may be solicited from the merchant who submitted the new item in order to assign the new item to only one of the candidate classifications. For example, both of the classifications 312 and 324 may be provided to the merchant (e.g., using the merchant interface 130), and input from the merchant may be received to select one of the classifications 312 or 324 for listing the new item in the marketplace 150.

Figure 5:
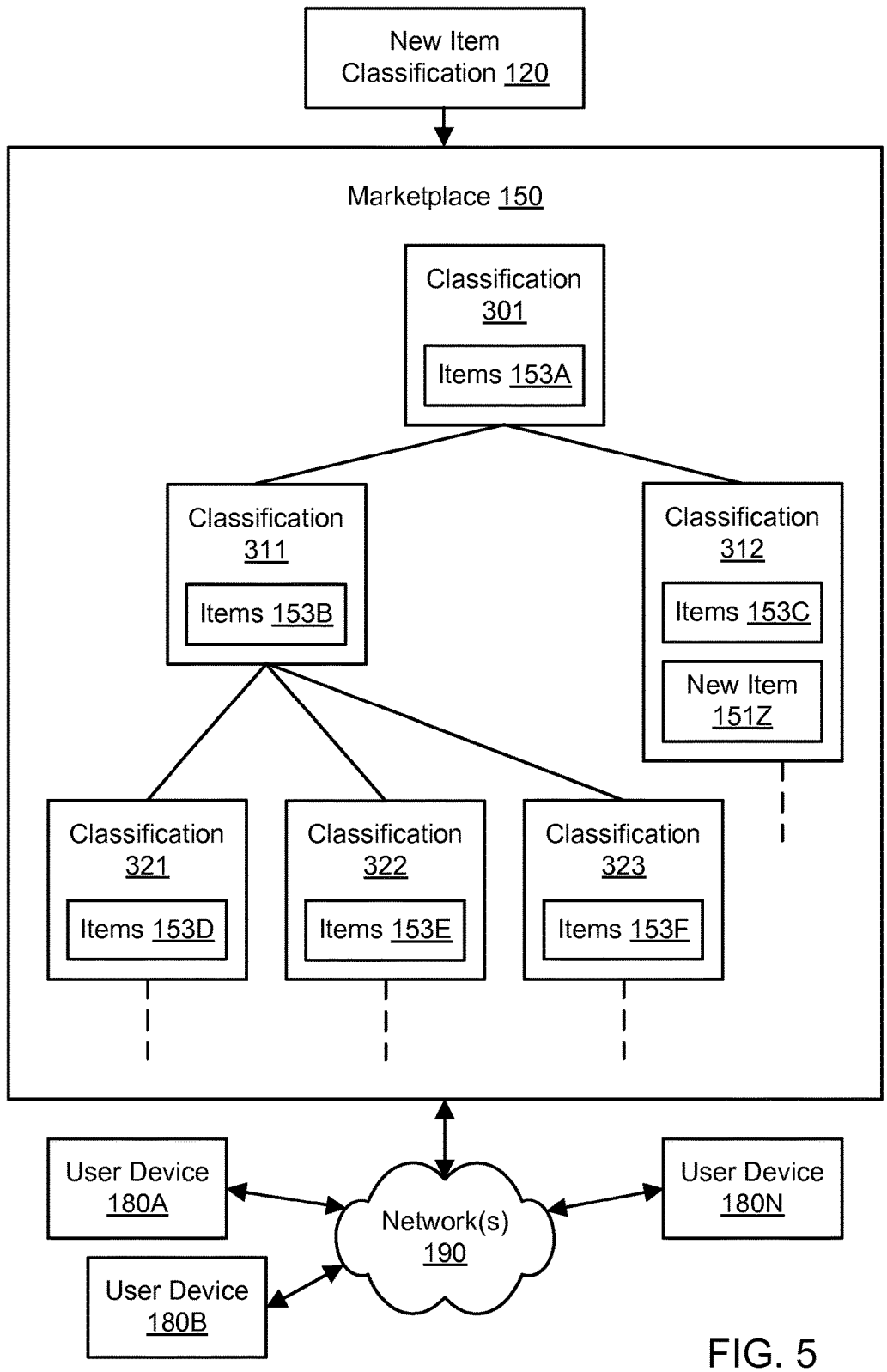
FIG. 5 illustrates an example of a marketplace of items in which an item is automatically classified using customer-visible attributes, according to one embodiment.

FIG. 5 illustrates an example of a marketplace of items in which an item is automatically classified using customer-visible attributes, according to one embodiment. After a new item 151Z has been assigned to one or more classifications in the taxonomy 115, such as the classification 312, the new item may be offered in those one or more classifications in the marketplace 150. The marketplace 150 may offer items in various classifications of the taxonomy 115, including items 153A in the broad classification 301, items 153B in the narrower classification 311, existing items 153C and the new item 151Z in the narrower classification 312, items 153D in the even narrower classification 321, items 153E in the even narrower classification 322, and items 153F in the even narrower classification 323. The marketplace 150 may generate one or more web pages that permit customers may navigate the taxonomy 115 quickly and efficiently to find items of interest, including the new item 151Z, in their respective classifications. Customers may use the user devices 180A-180N to send input to the marketplace 150 (e.g., input to search for particular items or navigate the taxonomy), receive web pages based on that input, and send additional input to the marketplace to navigate the taxonomy and/or participate in transactions (e.g., sale or rental) regarding one or more items.

Figure 6:
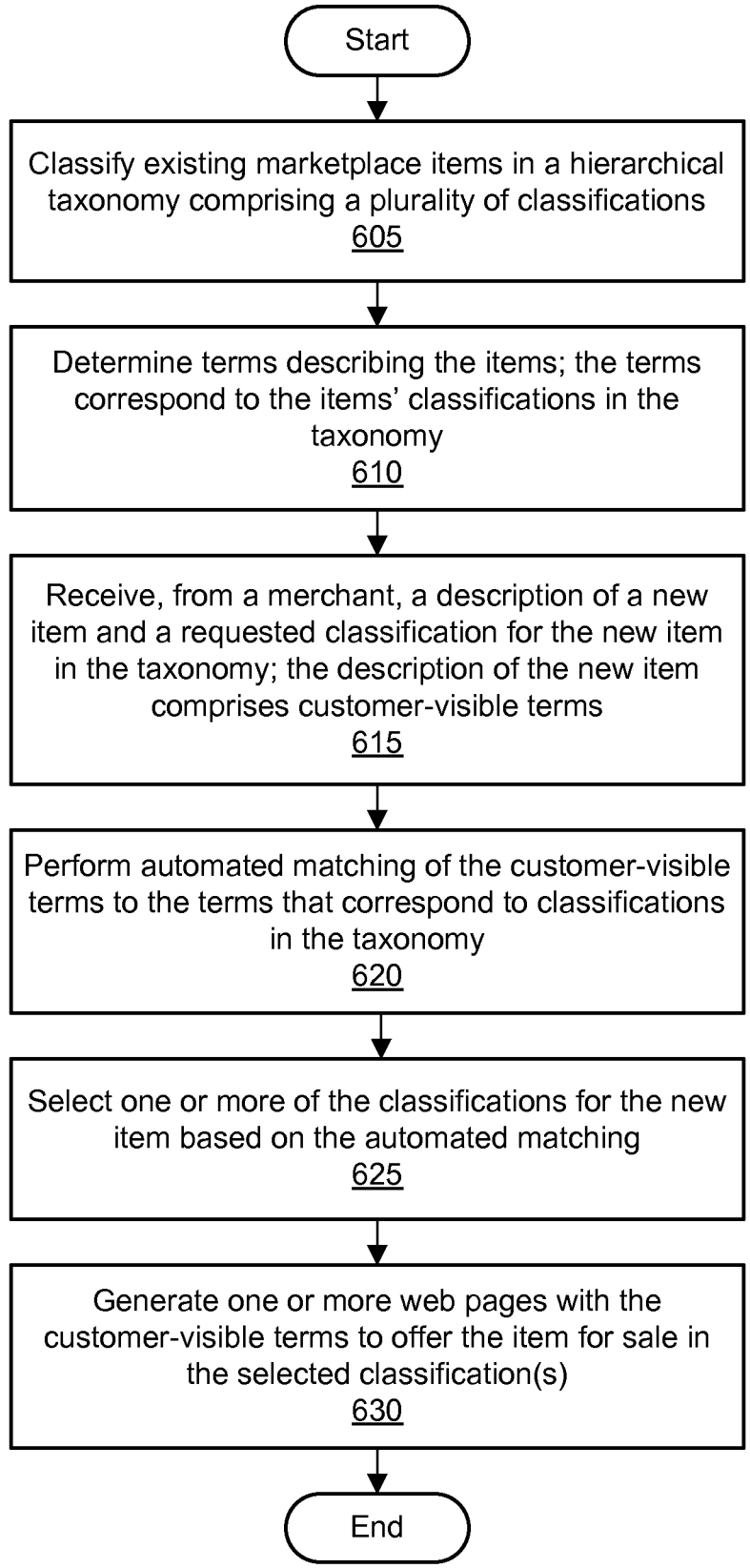
FIG. 6 is a flowchart illustrating a method for item classification using customer-visible attributes, according to one embodiment.

FIG. 6 is a flowchart illustrating a method for item classification using customer-visible attributes, according to one embodiment. As shown in 605, existing items in a marketplace may be classified into various classifications in a hierarchical taxonomy. Particular ones of the existing items may be classified using any suitable techniques, including manual techniques and/or automatic techniques. As shown in 610, a plurality of terms describing the items in the marketplace may be determined. Particular ones of the terms may correspond to particular ones of the classifications in the hierarchical taxonomy. In one embodiment, the descriptive terms may be determined for a set of "golden" items whose classifications have been verified. The classifications may be verified by automatic techniques or by manual techniques, e.g., involving input from one or more managers of various item categories in the marketplace.

As shown in 615, a description of a new item may be received. The description of the new item may include a plurality of customer-visible terms, e.g., as part of a title and/or description of the new item. In one embodiment, a requested classification for the new item in the hierarchical taxonomy may also be received. The requested classification may be selected from the plurality of classifications in the hierarchical taxonomy. The description of the new item and requested classification may be received from a merchant, e.g., by an item classification system.

As shown in 620, automated matching may be performed to match individual ones of the customer-visible terms to individual ones of the plurality of terms that corresponding to particular classifications in the hierarchical taxonomy. As shown in 625, based on the automated matching, one or more of the classifications in the hierarchical taxonomy may be selected for the new item. The new item may be placed in the selected classification(s) in the marketplace. As shown in 630, the new item may be offered to one of more customers of the marketplace by generating one or more web pages including the customer-visible terms, such that the new item is offered (e.g., for sale or rental) in the selected classification(s).

In selecting the one or more classifications for the new item, the requested classification and/or other customer-invisible attributes provided by a merchant may be disregarded. The requested classification may differ from the one or more classifications selected for the new item. In one embodiment, if the requested classification differs from the one or more automatically selected classifications, the merchant may be notified of the mismatch and/or additional input may be solicited from the merchant. In one embodiment, a plurality of candidate classifications may be determined for the new item (e.g., using the operation shown in 620), and the merchant may be asked to select one of the candidate classifications for listing the new item on the marketplace.

Figure 7:
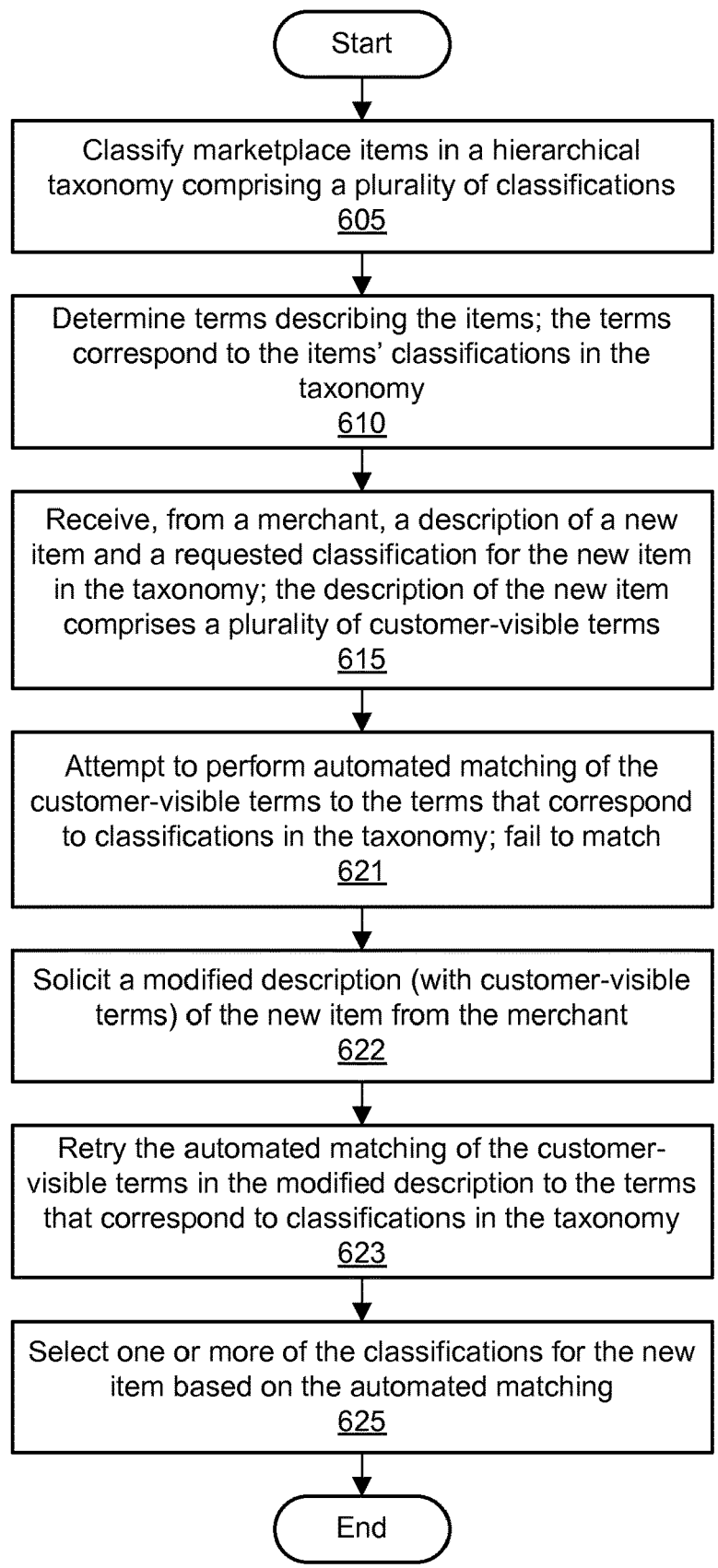
FIG. 7 is a flowchart illustrating a method for item classification using customer-visible attributes, including retrying the automated matching after a failure, according to one embodiment.

FIG. 7 is a flowchart illustrating a method for item classification using customer-visible attributes, including retrying the automated matching after a failure, according to one embodiment. As shown in 605, existing items in a marketplace may be classified into various classifications in a hierarchical taxonomy. Particular ones of the existing items may be classified using any suitable techniques, including manual techniques and/or automatic techniques. As shown in 610, a plurality of terms describing the items in the marketplace may be determined. Particular ones of the terms may correspond to particular ones of the classifications in the hierarchical taxonomy. In one embodiment, the descriptive terms may be determined for a set of "golden" items whose classifications have been verified. The classifications may be verified by automatic techniques or by manual techniques, e.g., involving input from one or more managers of various item categories in the marketplace.

As shown in 615, a description of a new item may be received. The description of the new item may include a plurality of customer-visible terms, e.g., as part of a title and/or description of the new item. In one embodiment, a requested classification for the new item in the hierarchical taxonomy may also be received. The requested classification may be selected from the plurality of classifications in the hierarchical taxonomy. The description of the new item and requested classification may be received from a merchant, e.g., by an item classification system.

As shown in 621, automated matching may be attempted to match individual ones of the customer-visible terms to individual ones of the plurality of terms that corresponding to particular classifications in the hierarchical taxonomy. As further shown in 621, the automated matching may fail, e.g., if no correspondence can be found between the descriptive terms supplied for the new item and the descriptive terms associated with various classifications in the taxonomy. As shown in 622, a corrected or otherwise modified description (with customer-visible terms) may be solicited from the merchant. As shown in 623, the automated matching may be retried to successfully match individual ones of the customer-visible terms in the modified description to individual ones of the plurality of terms that corresponding to particular classifications in the hierarchical taxonomy.

As shown in 625, based on the automated matching, one or more of the classifications in the hierarchical taxonomy may be selected for the new item. In selecting the one or more classifications for the new item, the requested classification and/or other customer-invisible attributes provided by a merchant may be disregarded. The new item may be placed in the selected classification(s) in the marketplace. Additionally, the new item may be offered to one of more customers of the marketplace by generating one or more web pages including the customer-visible terms, such that the new item is offered (e.g., for sale or rental) in the selected classification(s).

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may implement any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more computing devices configured to implement an item classification system, wherein the item classification system is configured to:
        analyze item descriptions of a plurality of items in a catalog to determine a plurality of terms corresponding to respective classifications of a plurality of classifications of a hierarchical taxonomy in which the items are already classified such that individual ones of the plurality of terms correspond to individual ones of the plurality of classifications in the hierarchical taxonomy, wherein the item descriptions include visible terms to display to users when accessing the catalog according to the hierarchical taxonomy;
        receive, from a new item submitter, a description of a new item and a requested classification for the new item to be added to the catalog in the hierarchical taxonomy, wherein the received description of the new item comprises a plurality of visible terms for display to users when accessing the catalog, and wherein the received requested classification is not part of the received description comprising visible terms and comprises one of the plurality of classifications in the hierarchical taxonomy;
        compare the received visible terms for the new item to the plurality of terms determined from the items descriptions for the plurality of items already classified to automatically select one or more of the plurality of classifications in the hierarchical taxonomy as one or more candidate classifications for the new item irrespective of the received requested classification;
        assign the new item to at least one of the candidate classifications in the hierarchical taxonomy; and
        generate an interactive webpage based at least in part on the hierarchical taxonomy, wherein the interactive webpage can be modified via user input to navigate the items in the catalog according to their classifications.

2. The system as recited in claim 1, wherein, to analyze item descriptions of the plurality of items to determine the plurality of terms, the item classification system is configured to:
    perform a statistical analysis to determine a frequency count of different terms in the item descriptions for items in a particular classification; and
    select one or more terms to represent the particular classification based on their frequency count.

3. The system as recited in claim 1, wherein the requested classification differs from the one or more of the plurality of classifications selected as the one or more candidate classifications for the new item.

4. A computer-implemented method, comprising:
    analyzing item descriptions of a plurality of items in a catalog to determining a plurality of terms corresponding to respective classifications of a plurality of classifications of a hierarchical taxonomy in which the items are already classified such that individual ones of the plurality of terms correspond to individual ones of the plurality of classifications in the hierarchical taxonomy, wherein the item descriptions include visible terms to display to users when accessing the catalog according to the hierarchical taxonomy;

receiving, from a new item submitter, a description of a new item and a requested classification for the new item, wherein the received description of the new item comprises a plurality of visible terms for display to users when accessing the catalog, and the received requested classification is not part of the received description comprising visible terms and comprises one of the classifications in the hierarchical taxonomy;

automatically selecting one or more of the plurality of classifications in the hierarchical taxonomy for the new item, irrespective of the requested classification, wherein said automatically selecting comprises comparing the received visible terms for the new item to the plurality of terms determined from the items descriptions for the plurality of items already classified; and generating an interactive interface based at least in part on the hierarchical taxonomy, wherein the interactive webpage can be modified via user input to navigate the items in the catalog according to their classifications.

5. The method as recited in claim 4, wherein analyzing the item descriptions of the plurality of items in the catalog to determining the plurality of terms comprises:

performing a statistical analysis to determine a frequency count of different terms in the item descriptions for items in a particular classification; and selecting one or more terms to represent the particular classification based on their frequency count.

6. The method as recited in claim 4, wherein the requested classification differs from the one or more of the plurality of classifications selected for the new item.

7. The method as recited in claim 4, further comprising:

notifying the new item submitter that the requested classification differs from the one or more of the plurality of classifications selected for the new item.

8. The method as recited in claim 4, wherein selecting one or more of the plurality of classifications in the hierarchical taxonomy for the new item comprises:

determining a plurality of candidate classifications in the hierarchical taxonomy for the new item, wherein the plurality of candidate classifications are determined for the new item based at least in part on automated matching of individual ones of the plurality of visible terms to individual ones of the plurality of terms corresponding to individual ones of the plurality of classifications in the hierarchical taxonomy; and assigning the new item to at least one of the candidate classifications based at least in part on a selection received from the new item submitter.

9. The method as recited in claim 4, further comprising:

receiving a description of an additional new item, wherein the description of the additional new item comprises an additional plurality of visible terms for display to users when accessing the catalog;

determining that the additional plurality of visible terms do not match the plurality of terms corresponding to individual ones of the plurality of classifications in the hierarchical taxonomy;

soliciting a modified description of the additional new item, wherein the modified description of the additional new item comprises a modified additional plurality of visible terms for display to users when accessing the catalog; and selecting one or more of the plurality of classifications in the hierarchical taxonomy for the additional new item, wherein the one or more of the plurality of classifications are selected for the additional new item based at least in part on automated matching of individual ones of the modified additional plurality of visible terms to individual ones of the plurality of terms corresponding to individual ones of the plurality of classifications in the hierarchical taxonomy.

10. The method as recited in claim 4, further comprising:

receiving a description of an additional new item, wherein the description of the additional new item comprises an additional plurality of visible terms for display to users when accessing the catalog; and determining that individual ones of the additional plurality of visible terms are mutually exclusive with respect to individual ones of the plurality of classifications in the hierarchical taxonomy.

11. The method as recited in claim 4, wherein the respective classifications for the plurality of items in the catalog are verified.

12. The method as recited in claim 4, wherein the interactive interface comprises at least one web page displaying the new item with the new item's description comprising the plurality of visible terms, wherein the new item is displayed according to the one or more of the plurality of classifications in the hierarchical taxonomy selected for the new item.

13. A computer-readable storage medium storing program instructions that when executed on one or more processors of an item classification system, cause the item classification system to:

analyze item descriptions of a plurality of items in a catalog to determining a plurality of terms corresponding to respective classifications of a plurality of classifications of a hierarchical taxonomy in which the items are already classified such that individual ones of the plurality of terms correspond to individual ones of the plurality of classifications in the hierarchical taxonomy, wherein the item descriptions include visible terms to display to users when accessing the catalog according to the hierarchical taxonomy;

receive, from a new item submitter, a description of a new item and a requested classification for the new item, wherein the received description of the new item comprises a plurality of visible terms for display to users when accessing the catalog, and the received requested classification is not part of the received description comprising visible terms and comprises one of the classifications in the hierarchical taxonomy;

automatically select one or more of the plurality of classifications in the hierarchical taxonomy for the new item, irrespective of the requested classification, wherein said automatically selecting comprises comparing the received visible terms for the new item to the plurality of terms determined from the items descriptions for the plurality of items already classified; and generate an interactive interface based at least in part on the hierarchical taxonomy, wherein the interactive webpage can be modified via user input to navigate the items in the catalog according to their classifications.

14. The computer-readable storage medium of claim 13, wherein to analyze item descriptions of the plurality of items to determine the plurality of terms, the program instructions when executed on the one or more processors cause the item classification system to:
  perform a statistical analysis to determine a frequency count of different terms in the item descriptions for items in a particular classification; and
  select one or more terms to represent the particular classification based on their frequency count.

15. The computer-readable storage medium of claim 13, wherein the requested classification differs from the one or more of the plurality of classifications selected as the one or more candidate classifications for the new item.

16. The computer-readable storage medium of claim 13, wherein the program instructions when executed on the one or more processors cause the item classification system to:
  notify the new item submitter that the requested classification differs from the one or more of the plurality of classifications selected for the new item.

17. The computer-readable storage medium of claim 13, wherein to select one or more of the plurality of classifications in the hierarchical taxonomy for the new item, the program instructions when executed on the one or more processors cause the item classification system to:
  determine a plurality of candidate classifications in the hierarchical taxonomy for the new item, wherein the plurality of candidate classifications are determined for the new item based at least in part on automated matching of individual ones of the plurality of visible terms to individual ones of the plurality of terms corresponding to individual ones of the plurality of classifications in the hierarchical taxonomy; and
  assign the new item to at least one of the candidate classifications based at least in part on a selection received from the new item submitter.

18. The computer-readable storage medium of claim 13, wherein the program instructions when executed on the one or more processors cause the item classification system to:
  receive a description of an additional new item, wherein the description of the additional new item comprises an additional plurality of visible terms for display to users when accessing the catalog;
  determine that the additional plurality of visible terms do not match the plurality of terms corresponding to individual ones of the plurality of classifications in the hierarchical taxonomy;
  solicit a modified description of the additional new item, wherein the modified description of the additional new item comprises a modified additional plurality of visible terms for display to users when accessing the catalog; and
  select one or more of the plurality of classifications in the hierarchical taxonomy for the additional new item, wherein the one or more of the plurality of classifications are selected for the additional new item based at least in part on automated matching of individual ones of the modified additional plurality of visible terms to individual ones of the plurality of terms corresponding to individual ones of the plurality of classifications in the hierarchical taxonomy.

19. The computer-readable storage medium of claim 13, wherein the program instructions when executed on the one or more processors cause the item classification system to:
  receive a description of an additional new item, wherein the description of the additional new item comprises an additional plurality of visible terms for display to users when accessing the catalog; and
  determine that individual ones of the additional plurality of visible terms are mutually exclusive with respect to individual ones of the plurality of classifications in the hierarchical taxonomy.

20. The computer-readable storage medium of claim 13, wherein to generate the interactive interface, the program instructions when executed on the one or more processors cause the item classification system to:
  generate the interactive interface to include at least one web page displaying the new item with the new item's description comprising the plurality of visible terms, wherein the new item is displayed according to the one or more of the plurality of classifications in the hierarchical taxonomy selected for the new item.

\* \* \* \* \*